A. P. RICHARDSON.
AUTOMATIC INLET VALVE MECHANISM FOR FLUSH TANKS AND THE LIKE.
APPLICATION FILED JAN. 31, 1919.
1,311,713.
Patented July 29, 1919.
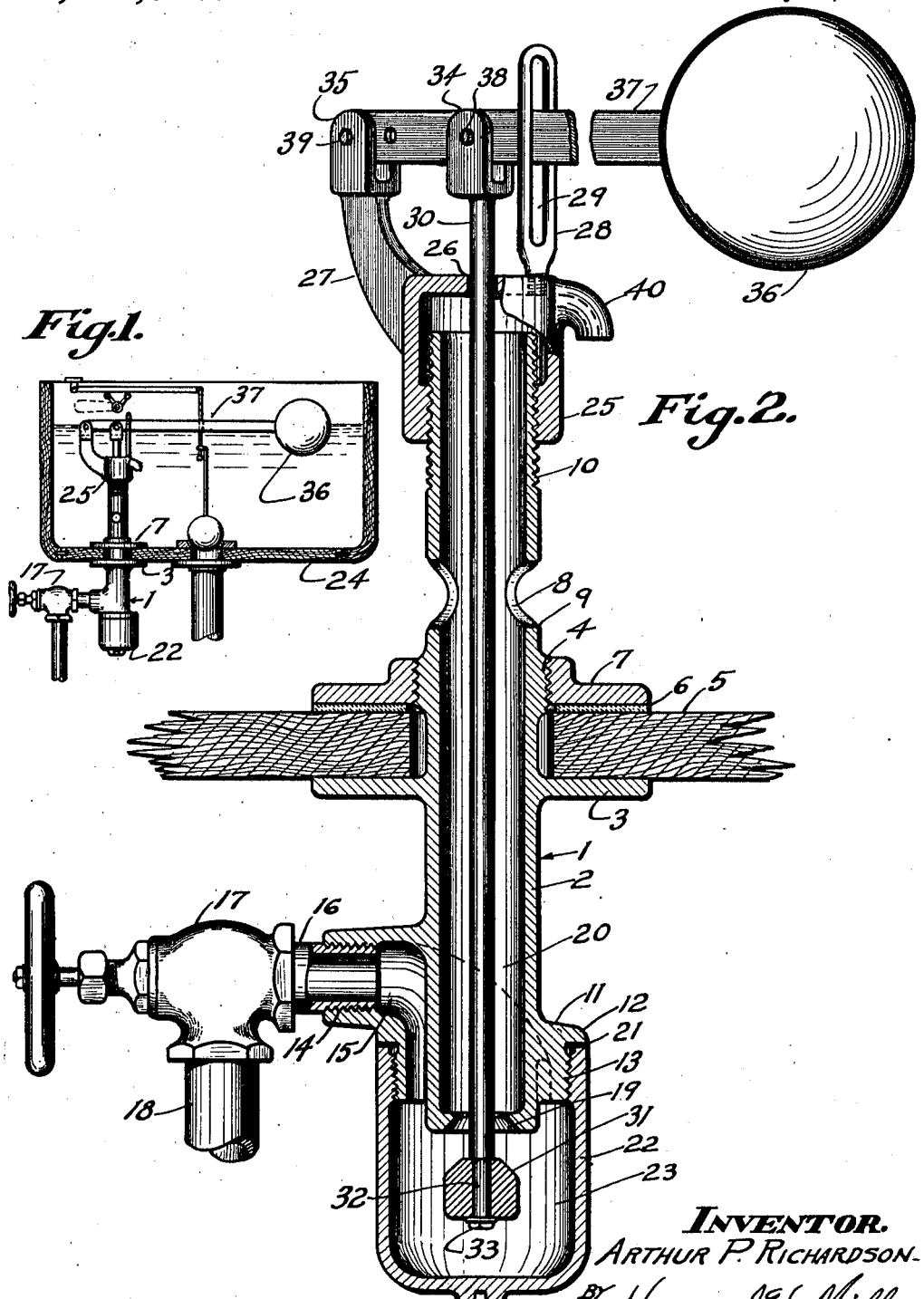

UNITED STATES PATENT OFFICE.

ARTHUR P. RICHARDSON, OF LOS ANGELES, CALIFORNIA.

AUTOMATIC INLET-VALVE MECHANISM FOR FLUSH-TANKS AND THE LIKE.

1,311,713. Specification of Letters Patent. Patented July 29, 1919.

Application filed January 31, 1919. Serial No. 274,254.

*To all whom it may concern:*

Be it known that I, ARTHUR P. RICHARDSON, a citizen of the United States, residing at Los Angeles, in the county of Los Angeles and State of California, have invented new and useful Improvements in Automatic Inlet-Valve Mechanism for Flush-Tanks and the like, of which the following is a specification.

My object is to make an automatic inlet valve mechanism for flush tanks and the like and my invention consists of the novel features herein shown, described and claimed.

An object of my invention is to make a float controlled valve in which the water pressure assists in closing the valve and assists in holding the valve closed.

Another object of my invention is to make a float controlled inlet valve in which the valve seat, the valve, and the valve chamber are outside of the tank so as to be accessible for tightening, repairing and the like.

Figure 1 is a sectional elevation of a flush tank showing an automatic inlet valve mechanism embodying the principles of my invention.

Fig. 2 is an enlarged vertical sectional detail on a plane parallel with Fig. 1 and showing the automatic inlet valve mechanism, parts of the flush tank being broken away.

The water column 1 is a casting. A circular tubular neck 2 is formed integral with a clamping flange 3 and extends downwardly from the flange 3. An externally screw threaded portion 4 extends upwardly from the flange 3 through a bottom 5 of a flush tank or the like. A soft gasket 6 fits upon the upper face of the bottom 5 around the screw threaded portion 4 and a clamping flange nut 7 is screwed down against the gasket 6 to clamp the bottom 5 against the flange 3 and clamp the gasket 6 against the bottom 5. A circular portion 8 extends upwardly from the externally screw threaded portion 4 and has discharge openings 9 formed horizontally. An externally screw threaded portion 10 extends upwardly from the perforated portion 8. A valve seat head 11 is formed upon the lower end of the circular portion 2 and has an outwardly extending flange 12. An externally screw threaded nipple 13 extends downwardly from the flange 12 and an internally screw threaded nipple 14 extends laterally from the upper part of the head 11 and above the flange 12, there being a passage 15 cored in the casting 1 and leading from the nipple 14 downwardly through the nipple 13. A pipe nipple 16 is screwed into the nipple 14. An angle valve 17 is screwed upon the pipe nipple 16 and a water supply pipe 18 is connected to the angle valve 17.

A valve seat 19 is formed in the lower face of the head 11 and a water column chamber 20 leads upwardly from the valve seat to the upper end of the externally screw threaded portion 10. A gasket 21 is placed against the lower face of the flange 12 and a long cap 22 is screwed upon the nipple 13 against the gasket 21 to form the valve chamber 23 communicating through the valve seat 19 with the chamber 20, and the passage 15 leads to the chamber 23 so that when the valve 17 is opened water will flow through the pipe 18, through the valve 17, through the nipple 16, through the passage 15 to the valve chamber 23, and so that when the valve is unseated the water will flow from the valve chamber 23 through the valve seat 19, through the water column chamber 20 and through the openings 8 into the flush tank 24.

A cap 25 is screwed down upon the externally screw threaded portion 10, there being a central opening 26 through the cap. A pivot bracket 27 extends outwardly and upwardly from the cap 25, and a guide bracket 28 extends upwardly from the cap 25 at the opposite side of the opening 26 from the pivot bracket 27, said guide bracket 28 having a vertical slot 29.

A valve stem 30 is inserted downwardly through the opening 26 and a rubber valve 31 is placed upon a reduced lower end 32 of the valve stem and held in place by a nut 33, said valve 31 being below the valve seat 19. A bifurcated head 34 is formed upon the upper end of the valve stem 30 and a second bifurcated head 35 is formed upon the upper end of the pivot bracket 27. A float 36 is fixed upon one end of a float lever 37 and the float lever 37 is inserted through the slot 29 and placed in the bifurcations in the heads 34 and 35. A pivot 38 is inserted through the head 34 and through the intermediate portion of the lever 37, and a second pivot 30 is inserted through the head 35 and through the end of the lever 37 so as to mount the lever 37 normally in a substantially horizontal position.

A spout 40 discharges outwardly and downwardly from the upper part of the cap 25.

In the practical operation when the tank 24 is empty the float 36 will swing the long end of the lever 37 downwardly, thereby pushing the valve stem 30 downwardly to carry the valve 31 a considerable distance away from the valve seat 19. When the valve 17 is opened water will flow into the tank 24 through the openings 9 and spout 40 until the water raises the float 36 to raise the valve 31 near to the valve seat 19, then the pressure of the water in the chamber 23 will snap the valve closed and assist in holding the valve closed. When the water is again discharged from the tank 24 the weight of the float 36 will overcome the water pressure against the valve 31 and open the valve. It is intended that the valve 31 shall be constructed so that the water pressure in the chamber 23 will only partly overcome the force of the float 36, and in order that the mechanism shall be sure in its action it is desirable that the lever 37 be longer than usual and that the float 36 be larger and heavier than usual so that the float will have sufficient power to overcome the tendency of the water pressure to hold the valve closed and open the valve.

Thus I have produced an automatic inlet valve mechanism in which the force exerted to close the valve is in the same direction as the force of the inflowing water so that the water pressure assists in closing the valve and assists in holding the valve closed.

Broadly, my automatic inlet valve mechanism consists of means forming a water column adapted to be mounted through the wall of the storage receptacle; a valve construction at the lower end of the water column outside of the wall; a float construction inside of the storage receptacle for operating the valve construction, and the valve construction being adapted to close by upward movement.

The cap 25 is screwed upon a long running thread upon the portion 10 and the cap may be rotated to adjust the valve 31 to and from the seat 19 to give the proper valve action.

If desired, the cap 25 may be adjusted to give approximately the desired amount of depth to the water in the storage receptacle, then the valve stem 30 of the required length may be put in and the cap 25 accurately adjusted to give the desired valve action.

Various changes may be made without departing from the spirit of my invention as claimed.

I claim:

1. An automatic inlet valve mechanism comprising a water column casting having a tubular neck formed integral with a clamping flange and extending downwardly from the flange, an externally screw threaded portion extending upwardly from the flange, a tubular portion extending upwardly from the externally screw threaded portion and having discharge openings, an externally screw threaded portion extending upwardly from the said tubular portion, a valve seat head extending downwardly from the tubular neck and having an outwardly extending horizontal flange, an externally screw threaded nipple extending downwardly from the last named flange, an internally screw threaded nipple extending laterally from the upper part of the head above the said last named flange, there being a passage leading from the internally screw threaded nipple downwardly through the externally screw threaded nipple, a valve seat formed in the lower face of the valve seat head; a cap screwed down upon the externally screw threaded portion, there being a central opening through the cap; a pivot bracket extending outwardly and upwardly from the cap; a guide bracket extending upwardly from the cap at the opposite side of the opening from the pivot bracket, said guide bracket having a vertical slot; a valve stem inserted downwardly through the opening and through the water column casting; a valve upon the lower end of the valve stem in position to engage the valve seat; a bifurcated head upon the upper end of the valve stem; a second bifurcated head upon the upper end of the pivot bracket; a float lever connected to the second bifurcated head and to the first bifurcated head and inserted through the slot in the guide bracket; a float upon the float lever; and a cap screwed upon the externally screw threaded nipple of the valve seat head and covering the valve seat and the valve and connecting the passage from the internally screw threaded nipple to the interior of the water column casting through the valve seat.

2. In an automatic inlet valve mechanism, a water column casting having a tubular neck formed integral with a clamping flange and extending downwardly from the flange, an externally screw threaded portion extending upwardly from the flange, a tubular portion extending upwardly from the externally screw threaded portion and having discharge openings, an externally screw threaded portion extending upwardly from the said tubular portion, a valve seat head extending downwardly from the tubular neck and having an outwardly extending horizontal flange, an externally screw threaded nipple extending downwardly from the last named flange, an internally screw threaded nipple extending laterally from the upper part of the valve seat head above the said last named flange, there being a passage leading through the internally screw threaded nipple and downwardly through the externally screw threaded nipple, a valve seat formed in the lower face of the valve seat head, and a cap screwed upon the externally screw threaded nipple of the valve seat head and covering the valve seat and the valve and connecting the passage from the internally screw threaded nipple to the interior of the water column casting through the valve seat.

In testimony whereof I have signed my name to this specification.

ARTHUR P. RICHARDSON.